United States Patent
Wong et al.

(10) Patent No.: US 9,196,244 B2
(45) Date of Patent: Nov. 24, 2015

(54) METHODOLOGY FOR ENHANCED VOICE SEARCH EXPERIENCE

(71) Applicant: Nuance Communications, Inc., Burlington, MA (US)

(72) Inventors: Alfred K. Wong, Wayland, MA (US); Leor Doron, Needham, MA (US)

(73) Assignee: Nuance Communications, Inc., Burlington, MA (US)

( * ) Notice: Subject to any disclaimer, the term of this patent is extended or adjusted under 35 U.S.C. 154(b) by 33 days.

(21) Appl. No.: 14/149,985

(22) Filed: Jan. 8, 2014

(65) Prior Publication Data
US 2015/0194148 A1 Jul. 9, 2015

(51) Int. Cl.
- *G10L 15/00* (2013.01)
- *G10L 15/18* (2013.01)
- *G10L 15/22* (2006.01)
- *G10L 15/26* (2006.01)

(52) U.S. Cl.
CPC .............. *G10L 15/18* (2013.01); *G10L 15/22* (2013.01); *G10L 15/26* (2013.01)

(58) Field of Classification Search
CPC .......... G06F 17/30011; G06F 17/2785; G06F 17/30707; G06F 17/273; G06F 17/2745; G06F 17/277; G06F 17/2863; G06F 17/2872; G06F 17/241; G06F 17/2755; G06F 17/278
USPC .................................... 704/257, 2, 3, 4, 9, 10
See application file for complete search history.

(56) References Cited

U.S. PATENT DOCUMENTS

| 7,890,526 B1 | 2/2011 | Brewer et al. |
| 8,417,717 B2 | 4/2013 | Venkataraman et al. |
| 8,533,223 B2* | 9/2013 | Houghton ..................... 707/776 |
| 8,538,745 B2* | 9/2013 | Oya et al. ......................... 704/10 |
| 8,600,729 B2* | 12/2013 | Yang et al. ........................ 704/2 |
| 2005/0283468 A1 | 12/2005 | Kamvar et al. |
| 2006/0106769 A1 | 5/2006 | Gibbs |

OTHER PUBLICATIONS

Apr. 1, 2015 (WO) International Search Report & Written Opinion—App. No. PCT/US2015/010416.

Fuji, Atsushi, et al., "A Method for Open-Vocabluary Speech-Driven Text Retrieval," Cornell University Library, Jun. 9, 2002, accessed from http://arxiv.org/abs/cs/0206014, 9 pages.

* cited by examiner

*Primary Examiner* — Charlotte M Baker
(74) *Attorney, Agent, or Firm* — Banner & Witcoff, Ltd.

(57) ABSTRACT

Arrangements are described for reducing response latency in intelligent personal assistant applications. While receiving a user request, preemptive responses are automatically prepared for a received portion of the user request. Partial classification word candidates are generated for words in the received portion of the user request, and then a predictive component is applied to generate extended classification word candidates that include the partial classification word candidates and additional classification word candidates. A preliminary search is performed of the extended classification word candidates to prepare the preemptive responses. While the input request continues, the preemptive responses are updated, and when the input request ends, the prepared preemptive responses are used to respond to the user request.

21 Claims, 8 Drawing Sheets

METHODOLOGY FOR ENHANCED VOICE SEARCH EXPERIENCE

TECHNICAL FIELD

The present invention relates to reducing response latencies in intelligent personal assistant systems.

BACKGROUND ART

An automatic speech recognition (ASR) system determines what a speech input says. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \arg\max_{W} P(W \mid A)$$

Given a system of statistical acoustic models, this formula can be re-expressed as:

$$\hat{W} = \arg\max_{W} P(W)P(A \mid W)$$

where P(A|W) corresponds to the acoustic models and P(W) reflects the prior probability of the word sequence as provided by a statistical language model.

The acoustic models are typically probabilistic state sequence models such as hidden Markov models (HMMs) that model speech sounds using, for example, mixtures of probability distribution functions (Gaussians) or neural networks. Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

In recent years, the functionality provided on mobile devices by speech recognition technology has expanded significantly beyond mere text entry and searching to include intelligent personal assistant (IPA) systems using ASR that combine user inputs from speech and/or text together with context and location information and other information sources to actually carry out useful services for the user. IPA applications such as Apple's Siri and Nuance's Nina products have become widely available in contemporary smartphone devices. FIGS. 1A-C show various example screen shots of the application interface 100 from one such IPA application, Nuance Nina, used in a conversational dialog with the user to arrange for payment of a credit card bill from the user's checking account.

FIG. 2 shows various elements in a typical client-server IPA arrangement for use with mobile devices; for example, a cloud-based computing arrangement using cloud-based services. A user interface 201 on mobile device 200 receives an initially unknown speech input signal 208 from a user. A local/remote controller 204 generates a representation of the speech input 208 and local ASR processor 202 uses local recognition data sources 203 to perform local ASR processing of the speech input signal to determine local ASR results corresponding to the speech input. Local/remote controller 204 sends the speech input representations and/or the local recognition results over a wireless communication network 205 to the remote server 206 for remote ASR/IPA processing. The server ASR 212 uses server ASR data sources 207 to perform remote ASR processing and passes the recognition results over to the server IPA 209 which also accesses other applications 210 and other data sources 211 to perform actions based on the user input 208 and pass the results back through the remote server 206 to the mobile device 200 for display on the user interface 201.

While the specific arrangement shown in FIG. 2 might suggest that all the various server-side components are in a single common location, of course, that is just one specific cloud-based client server IPA arrangement, and it is understood that the present discussion and the invention described and claimed herein are not limited to that specific topology and in other specific topologies, for example, individual components may be in different locations and communicate with each other in a cloud-based arrangement (i.e., via the Internet).

One of the challenges of client-server IPA arrangements is the inherent response latency in the various system components. Specifically, there are three main sources of system latency: (1) ASR latency, (2) IPA latency, and (3) network latency. The speech recognition process requires some significant amount of audio (corresponding to several words) before being able to produce recognition text that matches the input speech with high degree of probability, thereby providing one latency component. The IPA process contributes another latency component as it processes the user input and interacts with other applications and data sources. In addition, the remote server arrangement also creates an additional response latency that reflects data transfer delays occurring over the communications network. The combined effects of all these response latencies can be minimized to some degree, but they cannot be entirely eliminated due to algorithmic limitations in the IPA process, the speech recognition process, and physical limitations on computer network speed. Still, it is very desirable to minimize the effects of response latencies for the user.

In a real-time IPA application, the user effects associated with response latencies are two-fold. First, the user has no clear picture of the current state of the IPA system. If an utterance has been spoken, but the system response has not yet appeared on the user interface, the system presents an undefined state to the user. For all the user knows, the system may have failed to record the audio, the network connection may have been interrupted in a server-based speech recognition system, the speech recognition engine may have failed to produce output text, the IPA process may be hung up, or there may be a delay and results may be produced eventually. In addition, the user cannot continue with workflow tasks until the results from the pending input utterance have been completely processed and the user interface has been updated.

U.S. Patent Publication 20120216134 describes one existing approach for dealing with speech recognition response latencies by providing the user with partial recognition results as the recognition process progresses. Partial results are words that the recognizer considers the most probable at a given instant during the recognition process. As such, partial results are subject to change and the latency reduction is only apparent in giving the user a sense of low latency without reducing the actual speech recognition latency.

SUMMARY

Embodiments of the present invention are directed to arrangements for reducing response latency in automatic speech recognition applications. While receiving a user request, preemptive responses are automatically prepared for a received portion of the user request. Partial classification word candidates are generated for words in the received portion of the user request, and then a predictive component is applied to generate extended classification word candidates that include the partial classification word candidates and additional classification word candidates. A preliminary search is performed of the extended classification word candidates to prepare the preemptive responses. While the input request continues, the preemptive responses are updated, and when the input request ends, the prepared preemptive responses are used to respond to the user request.

In specific embodiments, the predictive component may be based on a search language model. Automatic speech recognition of a spoken user request may be used for generating the one or more partial classification word candidates. The user request may be received from a remote mobile device by a local server preparing the preemptive responses. The preemptive responses may reflect geographical and/or temporal constraints.

DETAILED DESCRIPTION

Embodiments of the present invention minimize the actual response latencies in an IPA system using speech recognition by preparing preemptive partial responses while receiving a user request. The preemptive responses are updated while the user request continues; when the request ends, the preemptive responses provide the basis for the system response to the user request.

Embodiments of the present invention apply to contexts in which the user is looking for a response to her/his request, e.g., find a restaurant, looking for a medical record, to be routed appropriately, etc. In the following explanation, it may be helpful to consider that there is a distinction between the ultimate objective of preparing such preemptive responses to the in-progress user request, and the preliminary goal of classifying the user input. A "classification" bears some surface language resemblance to the input. For example, given a user request: "find," its classification might be something like: "find best restaurants," whereas a "response" is not necessarily related in surface form to the user request; for example, given a user request: "find best restaurant," the system response might be: "Union Oyster House."

Figure 1A:
FIG. 1 A-C shows example screen shots from a mobile device application using client-server ASR.
Figure 1B:
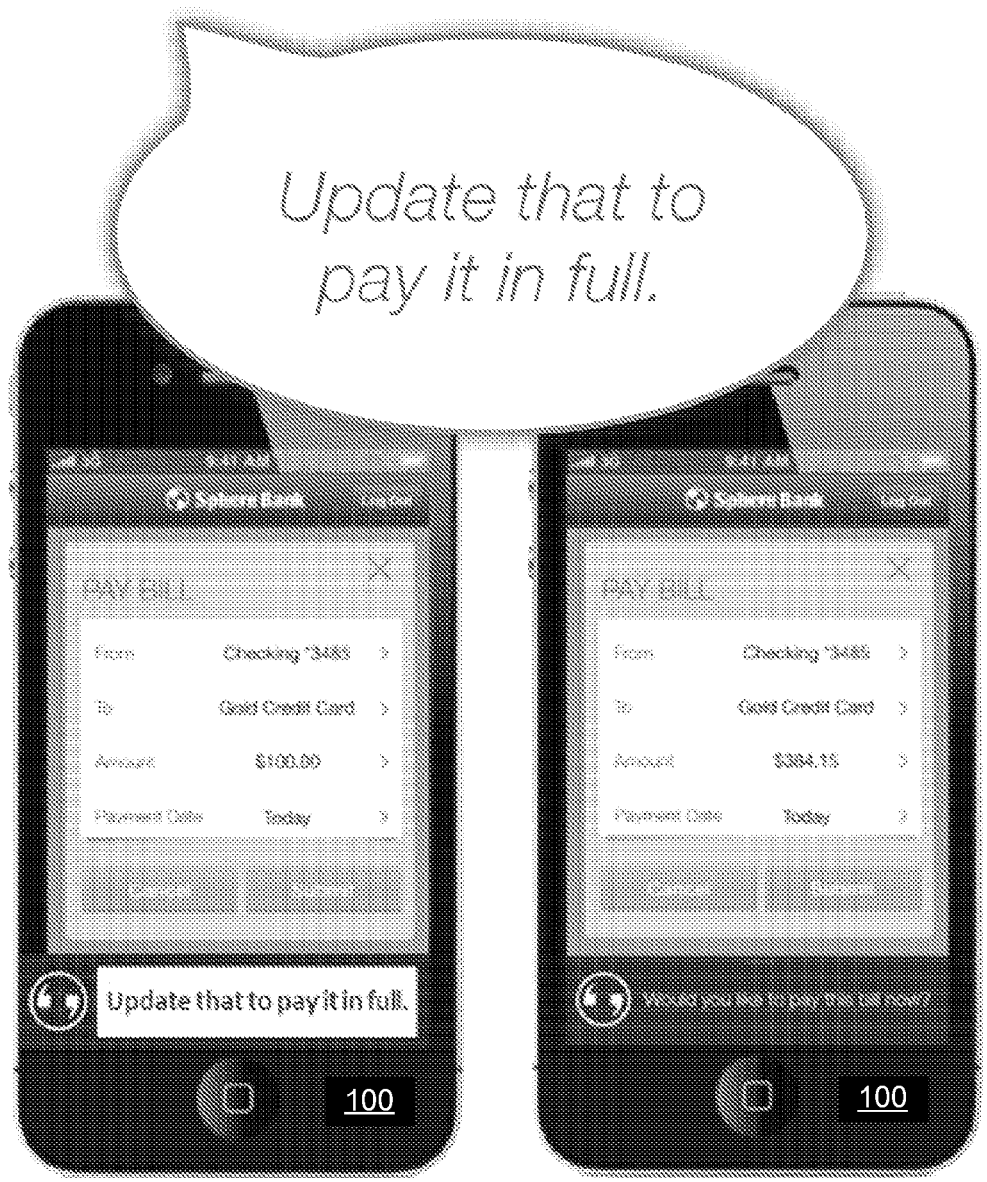
Figure 1C:
Figure 2:
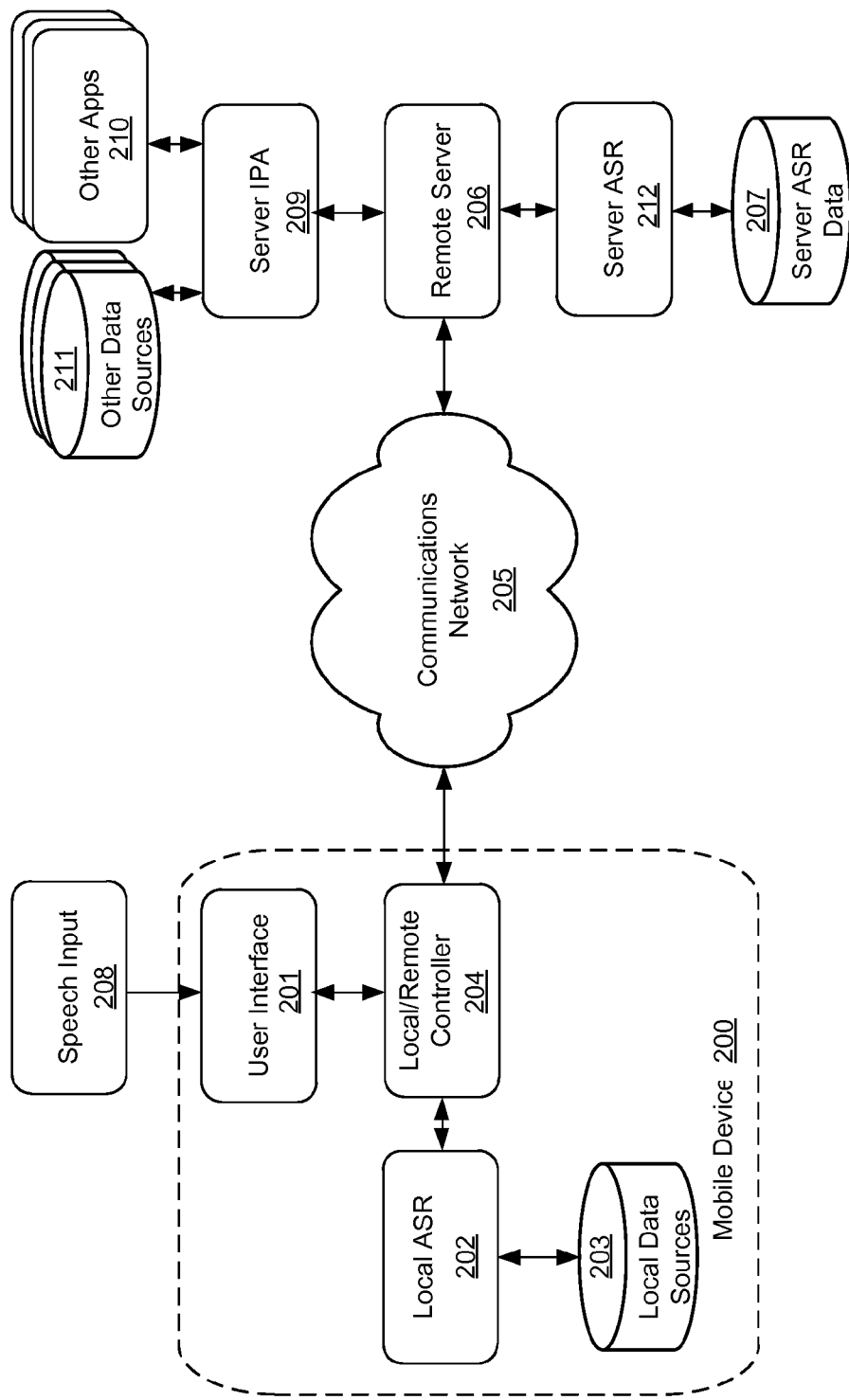
FIG. 2 shows various elements in a typical client-server IPA arrangement for mobile devices.
Figure 3:
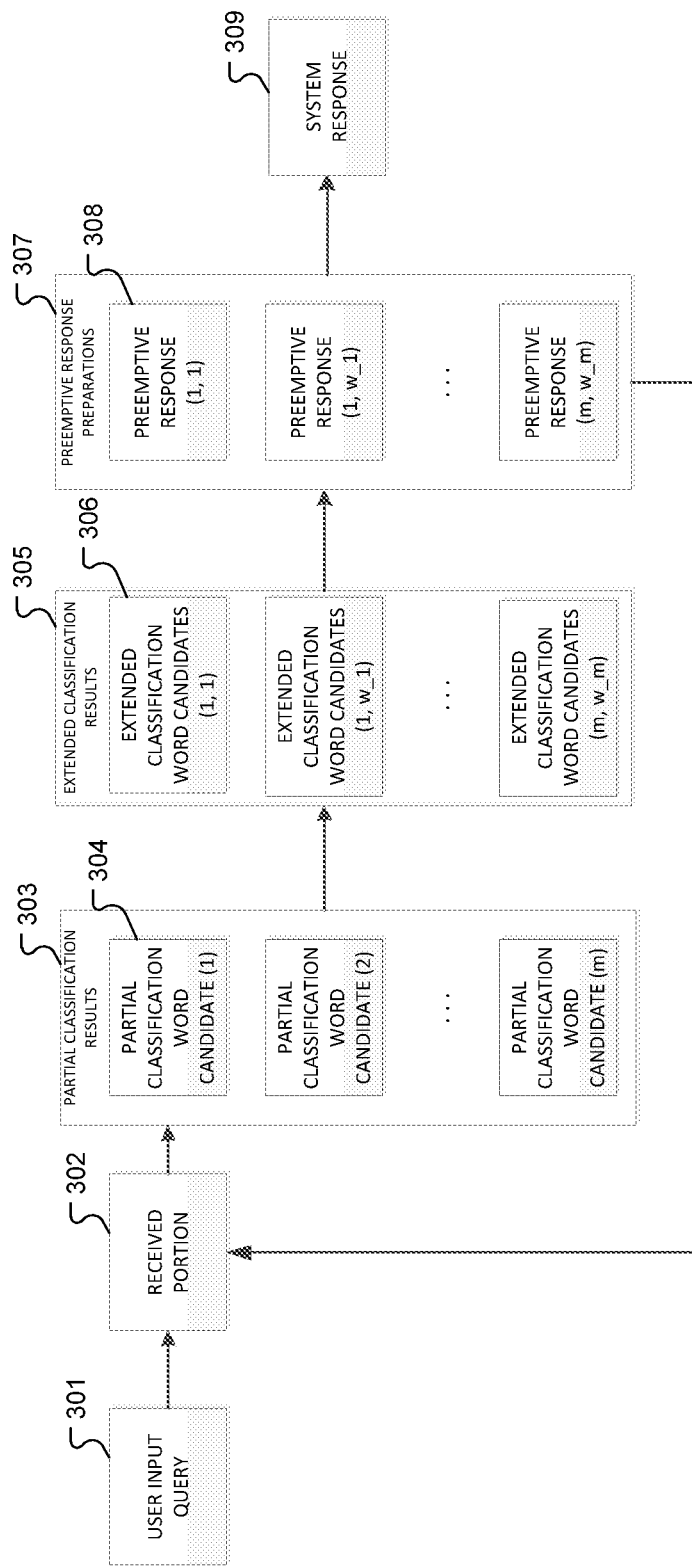
FIG. 3 shows the functional flow in a latency-minimized IPA arrangement according to an embodiment of the present invention.
Figure 4A:
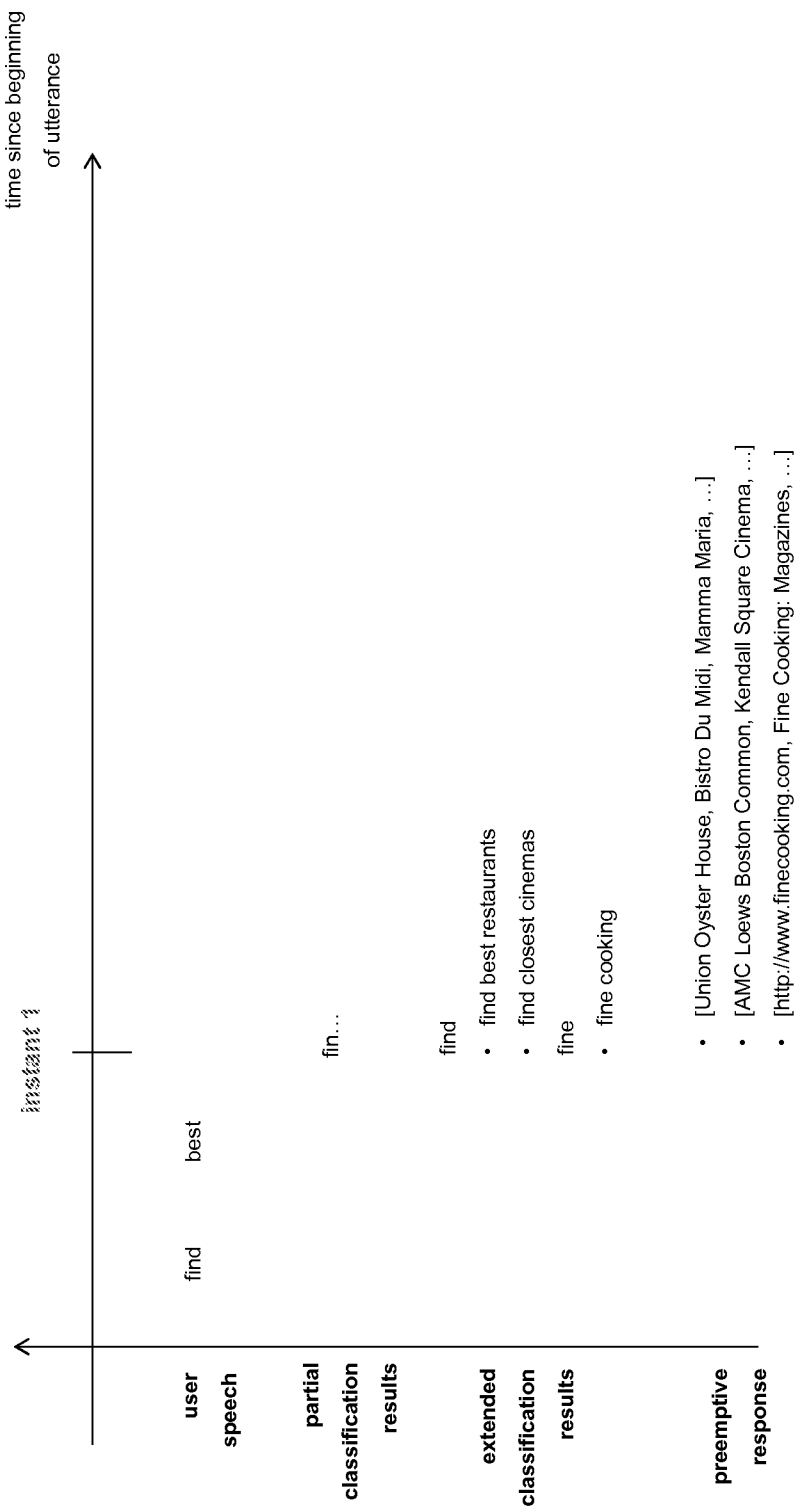
FIG. 4 A-C shows an example of preparing preemptive responses during an input request according to an embodiment of the present invention.
Figure 4B:
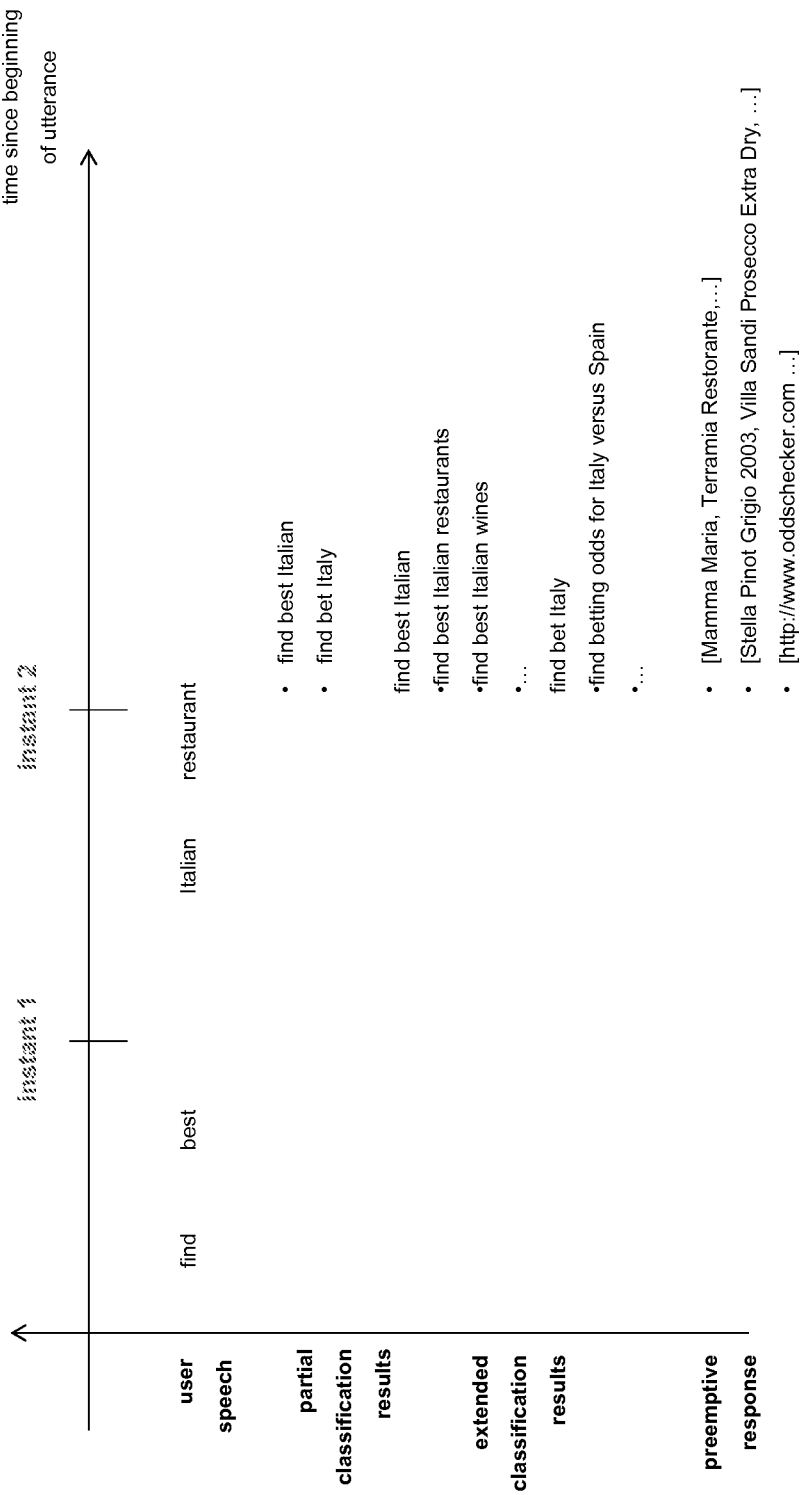
Figure 4C:
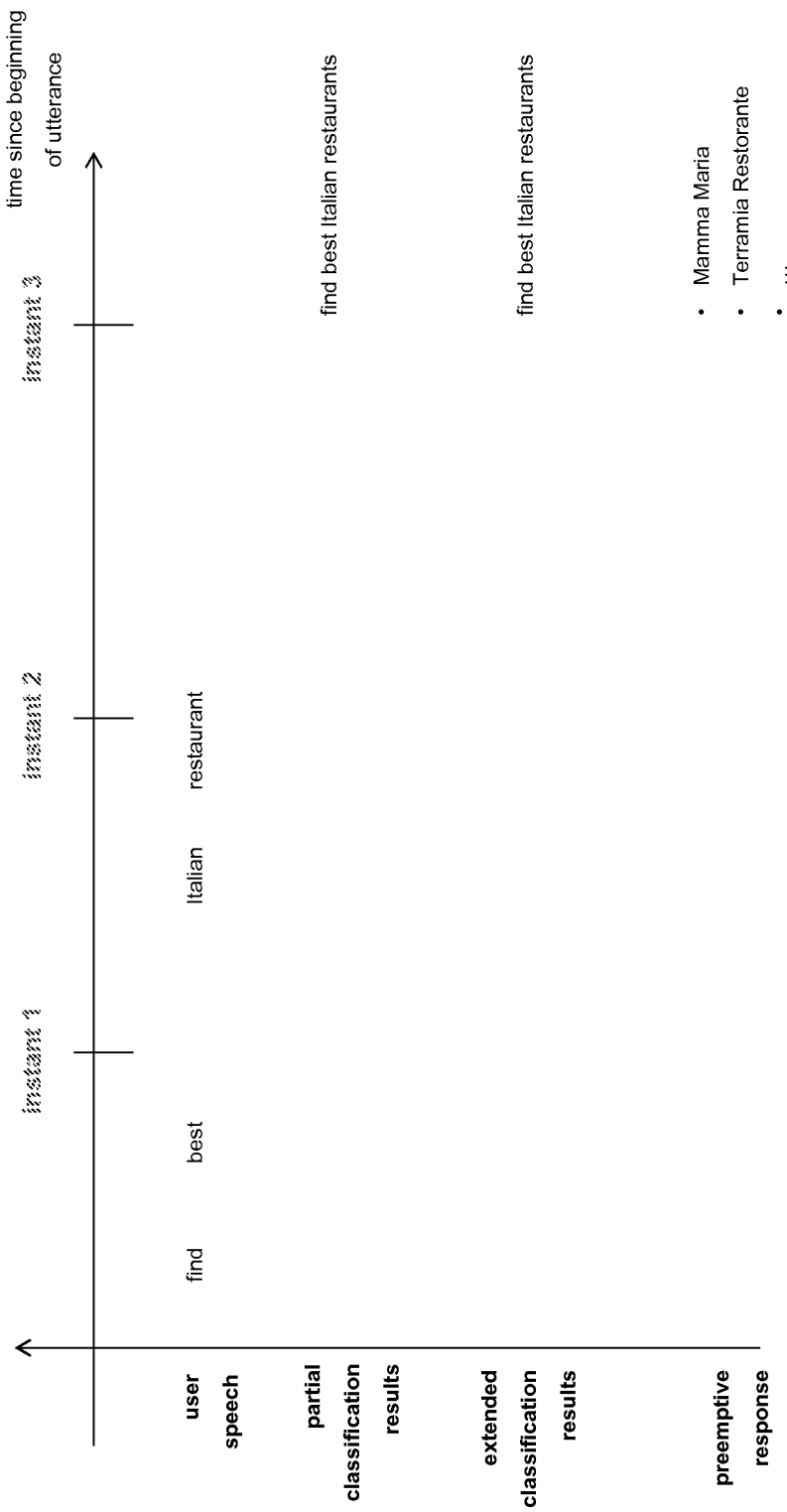

FIG. 3 shows the functional flow in a latency-minimized IPA arrangement and FIG. 4 A-C shows an example of preparing preemptive responses during an input request according to an embodiment of the present invention. Assuming a typical client-server IPA arrangement for a mobile device (such as the one shown in FIG. 2), Instant 1 on FIG. 4 represents the state of the system for an initial received portion 302 of a spoken user request 301, just after the user has spoken "find." While receiving the remainder of the user request, the system automatically starts preparing preemptive responses for the received portion 302.

As shown in FIG. 3, partial classification results 303 are generated for words in the received portion 302 of the user request 301 that include one or more partial classification word candidates 304 from automatic speech recognition of the received portion 302. Looking at the top of FIG. 4, the partial classification word candidates 304 for received portion 302 at Instant 1 are shown as including "find," "fine," etc.

A predictive component (e.g., based on a search language model) is applied to generate extended classification results 305 that include one or more extended classification word candidates 306 that include the partial classification word candidates 304 and additional classification word candidates generated by means of the predictive component. For example shown in FIG. 4 A, the extended word candidates 306 might be as follows:
find
    find best restaurants
    find closest cinemas
    ...
fine
    fine cooking
    ...
...

Because a predictive component generates the extended classification results 305, they may be either delayed in time with respect to the statue of the user request 301, or they may actually be advanced in time ahead of the instantaneous state of the user request 301.

The system then performs a preliminary search of the extended classification word candidates 306 resulting in the preemptive response preparations 307 including one or more preemptive responses 308. Examples of such preemptive responses 308 for Instant 1 on FIG. 4 A might include:

[Union Oyster House, Bistro Du Midi, Mamma Maria, ...]
[AMC Loews Boston Common, Kendall Square Cinema, ...]
[http://www.finecooking.com, Fine Cooking: Magazines, ...]
...

The preemptive responses 308 may reflect geographical constraints (e.g., near the user location or near a location referenced within the user request 301) and/or temporal constraints (e.g., at the time of the user request 301 or at a time referenced within the user request 301).

While the input request continues, the preemptive responses 308 are updated by iteratively repeating the process. So for example referring to FIG. 4 B, at Instant 2, the user request 301 is complete, the phrase "find best Italian restaurant", but due to system response latency, the recognition process is not yet complete and continues so that at Instant 2, the partial classification word candidates 304 might be:
find best Italian
find bet Italy
...
The predictive component updates the extended classification word candidates 306 at Instant 2 to include:
find best Italian
  find best Italian restaurants
  find best Italian wines
  ...
find bet Italy
  find betting odds for Italy versus Spain
  ...
And the preliminary search updates the preemptive responses 308 at Instant 2 (list may be modified):
[Mamma Maria, Terramia Restorante, ...]
[Stella Pinot Grigio 2003, Villa Sandi Prosecco Extra Dry, ...]
[http://www.oddschecker.com ...]

When the input request 301 ends, the prepared preemptive responses 308 are used to respond to the user request 301. Due to system response latency, this may be some time after the actual ending of the user request 301, but far sooner (much lower latency) than in conventional prior art arrangements. So for example in FIG. 4 C, at Instant 3 (some point after the completion of the user request 301, "find best Italian restaurant"), the final recognizer result will be an updated version of the extended classification results 305: find best Italian restaurant, and the final search results of updated preemptive responses 308 can be quickly provided as the system response 309: [Mamma Maria, Terramia Restorante, ...]. The user receives the system response 309 far sooner than in conventional prior art arrangements because the system selects the system response 309 based on the choices represented by the updated preemptive responses 308. In conventional prior art arrangements, the system response is slowed by two contributors to latency: recognition of the user input query 301 and performance of the necessary action according to the recognized input.

Embodiments of the invention may be implemented in whole or in part in any conventional computer programming language. For example, preferred embodiments may be implemented in a procedural programming language (e.g., "C") or an object oriented programming language (e.g., "C++", "C#"). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed:

1. A method for an intelligent personal assistant application using at least one hardware implemented computer processor to respond to a user request containing a plurality of words, the method comprising:
while receiving the user request:
automatically preparing preemptive responses for a received portion of the user request based on:
i. generating one or more partial classification word candidates for words in the received portion of the user request,
ii. applying a predictive component to the partial classification word candidates to generate one or more extended classification word candidates that include the partial classification word candidates and additional classification word candidates, and
iii. performing a preliminary search of the extended classification word candidates to prepare the preemptive responses; and
while the input request continues, continuing the preemptive response preparing and updating the preemptive responses; and
when the input request ends, using the prepared preemptive responses to respond to the user request.

2. The method according to claim 1, wherein the predictive component is based on a search language model.

3. The method according to claim 1, wherein the user request is a spoken user request.

4. The method according to claim 3, wherein automatic speech recognition of the spoken user request is used for generating one or more partial classification word candidates.

5. The method according to claim 1, wherein the user request is received from a remote device by a local server preparing the preemptive responses.

6. The method according to claim 1, wherein the preemptive responses reflect geographical constraints.

7. The method according to claim 1, wherein the preemptive responses reflect temporal constraints.

8. A system comprising:
at least one processor; and
a memory device operatively connected to the at least one processor;
wherein, responsive to execution of program instructions accessible to the at least one processor, the at least one processor is configured to:
while receiving the user request:
automatically prepare preemptive responses for a received portion of the user request based on:
i. generating one or more partial classification word candidates for words in the received portion of the user request,
ii. applying a predictive component to the partial classification word candidates to generate one or more extended classification word candidates that include the partial classification word candidates and additional classification word candidates, and
iii. performing a preliminary search of the extended classification word candidates to prepare the preemptive responses; and
while the input request continues, continue the preemptive response preparing and updating the preemptive responses; and
when the input request ends, use the prepared preemptive responses to respond to the user request.

9. The system according to claim 8, wherein the predictive component is based on a search language model.

10. The system according to claim 8, wherein the user request is a spoken user request.

11. The system according to claim 10, wherein automatic speech recognition of the spoken user request is used for generating the one or more partial classification word candidates.

12. The system according to claim 8, wherein the user request is received from a remote device by a local server preparing the preemptive responses.

13. The system according to claim 8, wherein the preemptive responses reflect geographical constraints.

14. The system according to claim 8, wherein the preemptive responses reflect temporal constraints.

15. A computer program product encoded in a non-transitory computer-readable medium, which when executed by a computer causes the computer to perform the following operations:
while receiving the user request:
automatically preparing preemptive responses for a received portion of the user request based on:
i. generating one or more partial classification word candidates for words in the received portion of the user request,
ii. applying a predictive component to the partial classification word candidates to generate one or more extended classification word candidates that include the partial classification word candidates and additional classification word candidates, and
iii. performing a preliminary search of the extended classification word candidates to prepare the preemptive responses; and
while the input request continues, continuing the preemptive response preparing and updating the preemptive responses; and
when the input request ends, using the prepared preemptive responses to respond to the user request.

16. The computer program product according to claim 15, wherein the predictive component is based on a search language model.

17. The computer program product according to claim 15, wherein the user request is a spoken user request.

18. The computer program product according to claim 17, wherein automatic speech recognition of the spoken user request is used for generating the one or more partial classification word candidates.

19. The computer program product according to claim 15, wherein the user request is received from a remote device by a local server preparing the preemptive responses.

20. The computer program product according to claim 15, wherein the preemptive responses reflect geographical constraints.

21. The computer program product according to claim 15, wherein the preemptive responses reflect temporal constraints.

* * * * *